United States Patent [19]

Borugian

[11] 4,387,789
[45] Jun. 14, 1983

[54] ELECTRICAL BRAKE LINING WEAR INDICATOR

[75] Inventor: Dennis A. Borugian, Pittsburgh, Pa.

[73] Assignee: Rockwell International Corporation, Pittsburgh, Pa.

[21] Appl. No.: 205,029

[22] Filed: Nov. 7, 1980

Related U.S. Application Data

[63] Continuation-in-part of Ser. No. 86,218, Oct. 18, 1979, abandoned, which is a continuation of Ser. No. 934,570, Aug. 17, 1978, abandoned, which is a continuation of Ser. No. 827,997, Aug. 26, 1977, abandoned, which is a continuation of Ser. No. 707,435, Jul. 21, 1976, abandoned.

[51] Int. Cl.³ .................. B60T 17/22; F16D 66/02
[52] U.S. Cl. ..................... 188/1.11; 188/250 H
[58] Field of Search ............. 188/1.11, 250 A, 250 B, 188/250 G; 340/52 A; 116/208

[56] References Cited

U.S. PATENT DOCUMENTS

| | | | |
|---|---|---|---|
| 2,146,357 | 2/1939 | Schweikle | 188/1.11 |
| 2,217,176 | 10/1940 | Madison | 188/1.11 |
| 2,814,684 | 11/1957 | De Pascale | 188/1.11 |
| 3,088,549 | 5/1963 | Borsa | 188/1.11 |
| 3,298,466 | 1/1967 | Ayers et al. | 188/1.11 |
| 3,467,229 | 9/1969 | Deibel | 188/250 G |
| 3,553,643 | 1/1971 | Maras | 188/1.11 |
| 3,689,880 | 9/1972 | McKee et al. | 188/1.11 |
| 3,976,167 | 8/1976 | Hirai et al. | 188/1.11 |

FOREIGN PATENT DOCUMENTS

| | | | |
|---|---|---|---|
| 658298 | 4/1965 | Belgium | 188/250 A |
| 1817601 | 7/1970 | Fed. Rep. of Germany | 340/52 A |
| 1108284 | 1/1956 | France | 188/1.11 |
| 2266056 | 11/1975 | France | 188/1.11 |
| 1266276 | 3/1972 | United Kingdom | 188/1.11 |

Primary Examiner—Douglas C. Butler

[57] ABSTRACT

An indicator for indicating a predetermined amount of wear of a brake lining comprises a brake lining support member operably connected to a brake actuator and supported thereby, a brake lining is fixedly attached to the brake lining support member and when actuated by the brake actuator frictionally engages a rotating member rotatably mounted on an axle which carries the brake actuator, an electrical contact is connected to an electrical circuit and is disposed on the brake lining support member and insulated therefrom by insulator, the electrical contact has a head portion which contacts the rotating member and the brake lining support member frictionally engages the rotating member and the brake lining is worn to a predetermined level to complete the electrical circuit to energize an indicator connected to the electrical circuit.

1 Claim, 2 Drawing Figures

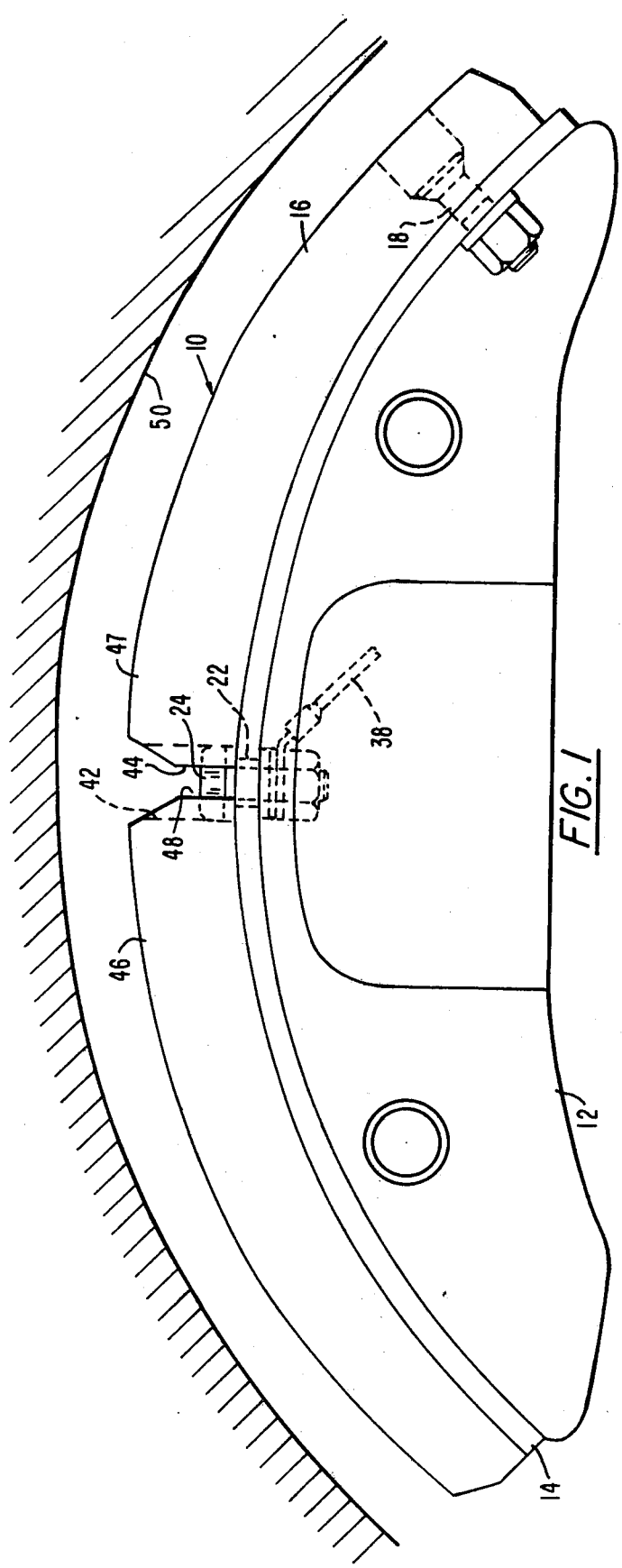
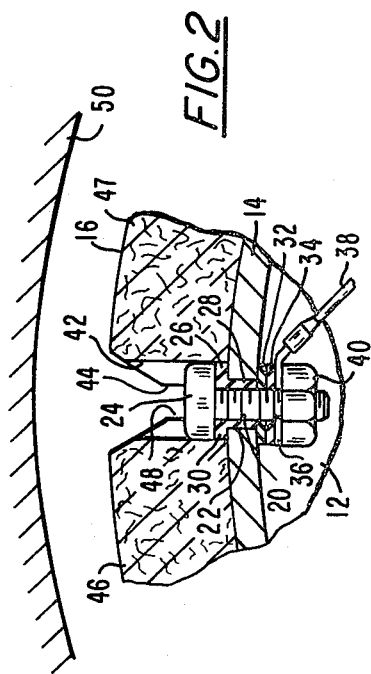

ELECTRICAL BRAKE LINING WEAR INDICATOR

This application is a continuation-in-part of application Ser. No. 86,218, filed Oct. 18, 1979, now abandoned which is a continuation of application Ser. No. 934,570, filed Aug. 17, 1978, abandoned, which is a continuation of application Ser. No. 827,997, filed Aug. 26, 1977, abandoned, which is a continuation of application Ser. No. 707,435, filed July 21, 1976, abandoned.

BACKGROUND OF THE INVENTION

1. Field of the Invention

This invention relates generally to an indicator means to remotely indicate the degree of wear of the vehicle brake lining. More particularly, the present invention relates to an indicator for indicating the predetermined amount of wear of the brake lining. The predetermined amount of wear being that amount characterized as "end-of-life" wear.

2. Description of the Prior Art

A continuing problem that plagues the trucking and automobile industry is the unexpected depletion of the brake linings. This occurs due to non-uniform driving and maintenance practices and procedures on the vehicle. Should the brake linings wear to a point where the shoes or the like are exposed to the brake system, they become generally inoperative and, in fact, may cause erratic and unpredictable braking responses. This latter hazard, i.e., erratic and unpredictable brake responses, can result in placing the vehicle in an accident situation. Additionally, undetected worn brake linings can result in considerable damage to the various operational parts of the braking system including the brake drum which, in turn, may result in high repair and replacement costs. Accordingly, from both an economic and safety point of view, it becomes imperative that a predetermined amount of wear on the brake lining be remotely indicated for timely maintenance and repair.

SUMMARY OF THE INVENTION

It is a primary object of the present invention to provide an indicator for indicating a predetermined amount of wear of a brake lining comprising a brake lining support member adapted for assembly in a brake mechanism to be supported thereby. A brake lining is fixedly bolted to the brake lining support member and is adapted to frictionally engage a rotating member associated with the brake mechanism. An electrical contact is resiliently disposed on the brake lining support member and is insulated therefrom by a resilient insulating bushing. The electrical contact comprises a threaded bolt attached to the brake lining support member and is held thereon by a threaded nut. The insulating bushing completely surrounds the threaded bolt and extends through the support member to insulate the threaded bolt from the brake lining support member. A resilient annular insulating washer surrounds the bolt and is disposed between the brake lining support member and the nut to further insulate the nut and bolt combination from the brake lining support member. The nut captures an electrical connector electrically connected to an insulated wire member. The brake lining support member is a brake shoe comprising a brake shoe table supported by and attached to a brake shoe web and the rotating member is a brake drum. The brake lining is provided in two longitudinal segments on the brake shoe table and the threaded bolt has a head disposed within a groove formed in a longitudinal end of each of the lining segments and within an opening separating the two segments of the lining midway from the end of the table. The threaded shank of the bolt is disposed in an aperture in the brake shoe table offset on the table from an intersection of the brake shoe table and brake shoe web. The head of the threaded bolt has a cylindrical head portion which engages the grooves and acts as an electrical contact. The threaded bolt is of brass which is a softer material than the drum and has a greater height than the bolt heads of the bolts that mechanically fasten the brake linings to the brake shoe table. The insulating bushing is provided with an annular shoulder disposed adjacent to the head portion to insulate it from the brake shoe table. The insulating washer is disposed on the side of the brake shoe table opposite the annular shoulder. The resilient insulating bushing and the annular insulating washer maintain the threaded bolt and nut in spaced relation from the brake shoe table. The threaded bolt and nut assembly float with respect to the brake shoe table to accommodate rotating irregularities in the alignment between the drum and brake shoe table.

It is another object of the present invention to provide an indicator for indicating the predetermined amount of wear of a brake lining which is itself easy to maintain, reliable in service and generally immune to the hostile environment to which it is exposed.

Another object of the present invention is that the indicator is simplistic in design and inexpensive to manufacture.

As a further important object of the present invention, the indicator can be manufactured using automatic high volume manufacturing techniques.

Other objects of the present invention and details of the structure of the indicator assembly will appear more fully from the following description and accompanying drawings.

DESCRIPTION OF THE DRAWINGS

FIG. 1 is a side elevational view partially in phantom form showing a brake shoe including a brake shoe web, a brake shoe table and a brake lining, the brake shoe embodying the preferred embodiment of the present invention.

FIG. 2 is a partial sectional view in elevation.

DESCRIPTION OF THE PREFERRED EMBODIMENT

Referring now to the drawings, including FIGS. 1 and 2, there is shown a brake shoe 10 embodying the concept of the present invention. The brake shoe 10 is adapted to be operably connected to and supported by various forms of brake mechanisms known in the prior art as, for example, the brake shoe 10 is adapted to be assembled in a brake apparatus as manufactured by Rockwell International Corporation and referred to as their "STOPMASTER" brakes. Typically, such a brake mechanism or assembly would include a brake spider (not shown) which is adapted to be bolted to an axle assembly (also not shown). The brake spider may typically form various parts of a brake actuating mechanism such as the housing for the wedge assembly and its associated plungers which interact with the brake shoe 10. Typically, the wedge assembly is driven by an air chamber which is connected to the service air of the vehicle with which the brake mechanism is associated. The brake plunger, which may include a self-adjusting mechanism, typically is actuated by the wedge assembly and is in driving engagement with the ends of the brake shoe web 12. The brake shoe web 12 is typically formed with or fixedly attached to a brake shoe table 14. It is the table 14 that provides the seating surface for the brake lining 16 and the brake lining 16 may be attached to the table in various ways as, for example, by a nut and bolt assembly 18. The brake lining 16 may be formed in a single piece and attached to the brake shoe table 14 or may be in the form of segments as shown in FIGS. 1 and 2.

The aforementioned parts and the descriptions thereof are consistent with what is known in the prior art and the present invention is to be found in the provision of an indicator for indicating a predetermined amount of wear of the brake lining 16. The basic concept of this present invention is to provide a contact means on the brake shoe 10 which, when in contact with the brake drum 50, is contacted by the brake lining 16 and completes the circuit to indicate that a predetermined amount of brake lining has been used or consumed.

To accomplish this object a contact in the form of, a threaded bolt 20 is disposed within aperture 22 in the brake shoe table 14. The threaded bolt 20 is provided with a circular head portion 24. The threaded bolt 20 and its head portion 24 may be manufactured from cartridge brass (SAE-CA-260 wire), ⅛ hard.

It may be added at this juncture that such brass material would be softer than the material typically found on the inner surface of the brake drum. Surrounding the threaded bolt 20 is a shouldered resilient insulating bushing or insulator 26 whose cylindrical portion 28 surrounds a portion of the threaded shank of the bolt 20 while the shoulder 30 provides an insulating gap between the head portion 24 and the brake shoe table 14, that is to say the shoulder 30 is provided on the same side of the brake shoe table as the head portion 24. The shouldered insulator 26 may be manufactured from a wide range of insulating material, for example, NEMA Grade 7 material. An annular washer 32 also surrounds the insulated bolt 20 on the side of the table 14 opposite the shoulder 30 of the shouldered insulator 26. An additional insulating washer 34 may also be provided adjacent the aforementioned washer 32. Both of the washers 32 and 34 may be manufactured from the same material as the shouldered insulator 26, namely, NEMA Grade 7. A terminal 36 of the eyelet type is also disposed on the bolt 20 to electrically connect the bolt 20 to an electrical lead 38. The function of the electrical lead 38 will be further described below. The above noted assemblage of washers, terminals and the like are all mechanically captured on the bolt 20 by a threaded torque nut 40. In a typical arrangement, the shouldered insulator 26 may be placed in the aperture 22 in the brake shoe table 14. After assembling the insulating washers 32 and 34 and the terminal 36 on the bolt 20, the nut 40 may be torqued on the bolt 20 to approximately 30–40 inch pounds. The resilient insulating bushing or insulator 26 and its associated insulating washers 32 and/or 34 not only insulate the bolt 20 from the brake shoe table 14 but also maintain the threaded bolt 20 in spaced relation from the brake shoe table 14 in such a manner that the threaded bolt 20 and the nut 40 are in a floating relation with respect to the brake shoe table 14. This spaced and floating relationship of the threaded bolt 20 and nut 40 with respect to the brake shoe table 14 will accommodate rotating irregularities in the alignment between the rotating drum and brake shoe table 14. This is important in that when the brake lining 16 is worn to a point where the circuit is completed, as before described, the drum will be seriously damaged by contacting a rigid member.

The electrical lead 38, as before mentioned, electrically connects the bolt 20 to an electrical system of the vehicle in which the brake shoe 10 is installed. The electrical system may include an indicating light or the like in the driver's compartment to indicate that the brake lining 16 is worn to a predetermined point. The completion of the circuit will occur when the brass bolt 20 contacts the rotating drum 50 against which the brake lining 16 acts. For example, it can be seen from FIG. 1 that the bolt 20 and, more particularly, the head portion 24 thereof will contact the brake drum 50 when the lining 16 wears to a point where its thickness is substantially equal to the height of the head portion 24 and the shoulder 30 of the shouldered insulator 26. At this point, the drum 50 will act as a ground for the electrical circuit; thus electricity will flow through the lead 38 through the terminal 36 and bolt 20 and will be grounded on and through the drum 50. As before noted, the brake lining 16 may be provided in segments and the bolt 20 may be provided within grooves 42 formed at spaced ends 44 of lining segments 46,47 and within the opening 48 separating the two segments of the lining 16. Further, the aperture 22 may be offset on the table 14 so as not to interfere with the brake shoe web 12. The indicator, as above described, may be provided on one brake shoe per axle or may be provided for each brake shoe assemblage on the vehicle, depending upon the degree of selectivity desired. Furthermore, the shouldered insulator 26 and the insulating washers 32 and 34 can be of suitably resilient material such that the bolt 20 floats with respect to the brake shoe table 14.

It is, therefore, obvious that the present invention is not to be limited to the specific details of the indicator above described; but is capable of other modifications and changes without departing from the spirit and scope of the appended claims.

I claim:

1. An indicator for indicating a predetermined amount of wear of a brake lining comprising: a brake lining support member adapted for assembly in a brake mechanism to be supported thereby, said brake lining being mechanically fastened to said brake lining support member by a plurality of bolts, said brake lining adapted to frictionally engage a rotating member associated with said brake mechanism, an electrical contact resiliently disposed on said brake lining support member and insulated therefrom by a shouldered resilient insulating bushing, said electrical contact comprising a threaded bolt attached to said brake lining support member and held thereon by a threaded nut, said insulating bushing completely surrounding said threaded bolt and extending through said support member to insulate said threaded bolt from said brake lining support member, a resilient annular insulating washer surrounding said bolt and disposed between said brake lining support member and said nut to further insulate said nut and bolt combination from said brake lining support member, said nut capturing an electrical connector on said bolt to electrically connect it thereto, said electrical connector electrically connected to an insulated wire member, said brake lining support member being a brake shoe comprising a brake shoe table supported by and attached to a brake shoe web and said rotating member being a brake drum, said brake lining being provided in two, separate longitudinal segments on said brake shoe table and said threaded bolt having a head disposed within a groove formed in a longitudinal end of each of said lining segments and within an opening separating said two segments of said lining midway from the end of said table, the threaded shank of said bolt being disposed in an aperture in said brake shoe table offset on said table from an intersection of said brake shoe table and said brake shoe web, said head of said threaded bolt having a cylindrical head portion which engages the groove in each of said lining segments and acts as said electrical contact, said threaded bolt being of brass and which material is a softer material than said drum and of a greater height than the bolt heads of the bolts that mechanically fasten said brake linings to said brake shoe table and said insulating bushing being provided with an annular shoulder seated directly on said brake shoe table and disposed adjacent to said head portion to insulate said portion from said brake shoe table, said insulating washer disposed on the side of said brake shoe table opposite said annular shoulder, said resilient insulating bushing and said annular insulating washer maintaining said threaded bolt and said nut in spaced relation from said brake shoe table and said threaded bolt and nut assembly floating with respect to said brake shoe table to accommodate rotating irregularities in alignment between said drum and said brake shoe table.

* * * * *